United States Patent [19]

Weber

[11] Patent Number: 5,009,325

[45] Date of Patent: Apr. 23, 1991

[54] CAP OF VENT NOZZLE

[75] Inventor: Walter K. Weber, Grand Rapids, Mich.

[73] Assignee: KB Lighting, Inc., Kentwood, Mich.

[21] Appl. No.: 478,262

[22] Filed: Feb. 9, 1990

[51] Int. Cl.$^5$ ............................................. B65D 51/16
[52] U.S. Cl. ..................................... 220/374; 215/307
[58] Field of Search ..................... 220/256, 367, 374; 215/307

[56] References Cited

U.S. PATENT DOCUMENTS

| | | | |
|---|---|---|---|
| 1,116,030 | 11/1914 | Dechamps | 220/374 X |
| 3,888,382 | 6/1975 | Blumhardt | 215/307 X |
| 4,337,875 | 7/1982 | Lyons | 220/374 X |
| 4,476,995 | 10/1984 | Bellino et al. | 220/371 |

Primary Examiner—Stephen Marcus
Assistant Examiner—Nova Stucker
Attorney, Agent, or Firm—Michael J. Striker

[57] ABSTRACT

A cap for vent nozzles comprises a main cap part turnably mountable on a lower nozzle member to adjust a passage through the vent nozzle, the main cap part having an inlet opening formed to communicate with an ambient atmosphere and allow air to come into the lower nozzle member and then into an interior of a device to be vented, an auxiliary cap part connected with the main cap part and provided with a passage and an outlet opening communicating with the passage, the auxiliary part being formed so that it is fittable on the main cap part so that in a fitted condition the passage communicates with the inlet opening of the main cap part and the outlet opening of the auxiliary cap part faces toward an interior of the vent nozzle in a direction opposite to the inlet opening of the main cap part.

5 Claims, 4 Drawing Sheets

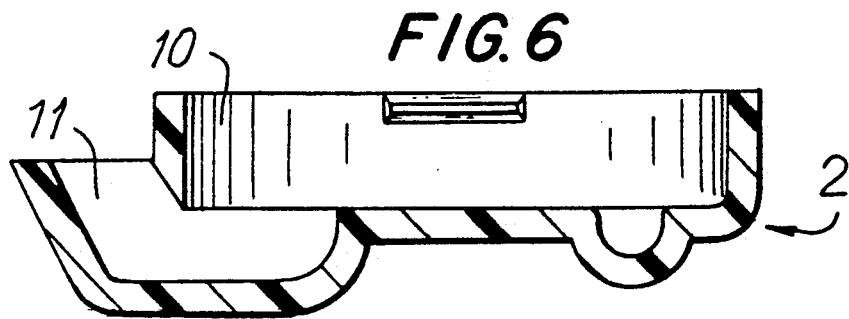
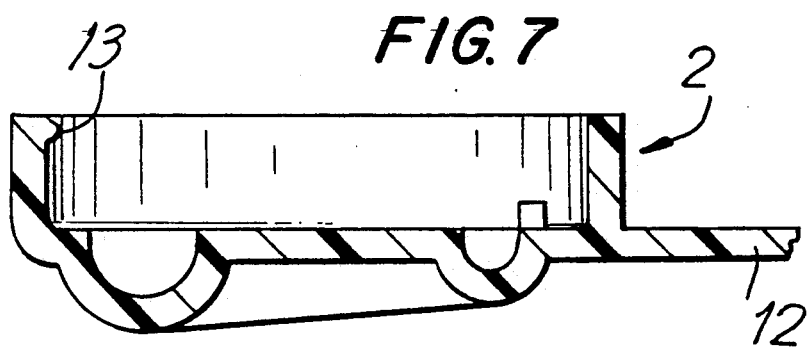
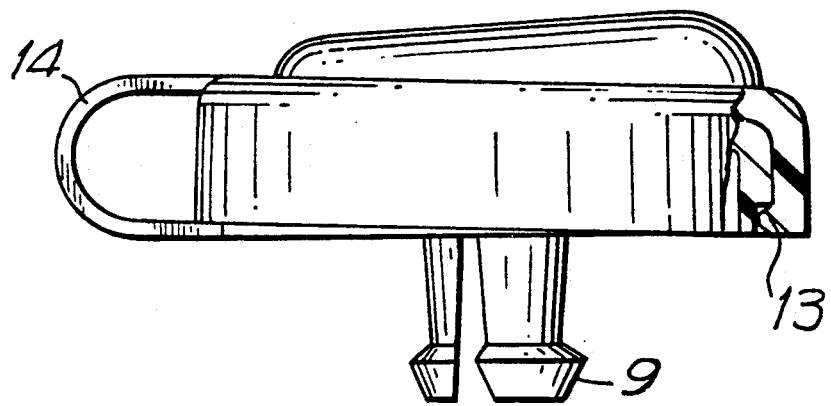

CAP OF VENT NOZZLE

BACKGROUND OF THE INVENTION

The present invention relates to caps for adjustable vent nozzles and particularly vent nozzles for headlamps, other lamps in the automotive field as well as other devices.

Vent nozzles for venting interiors of lighting equipment as well as other devices are widely known and used. Depending on the volume of the interior of the device to be vented, specific operational conditions, as well as other factors, the throughput of the vent nozzle has to be adjusted to provide an optimal ventilation. Known vent nozzles for these purposes possess certain disadvantages and can be further improved. A vent nozzle which can be easily adjusted to respective devices to be ventilated is proposed in our U.S. patent application Ser. No. 403,147. In this application the vent nozzle has two nozzle members which are turnable relative to one another and include a first nozzle member provided with an inlet opening for coomunicating an interior of the nozzle with ambient atmosphere and a second nozzle member provided with an outlet opening facing toward the interior of a device to be ventilated. The nozzle members are designed so that when one of the nozzle members is turned relative to the other nozzle member, a predetermined length of a passage between the inlet opening and the outlet opening can be adjusted. As a result, an air supply through the nozzle into the interior of the device to be vented can be adjusted. In this vent nozzle the first nozzle member or a cap is provided with the above mentioned inlet opening. When water is applied to the device for example during washing of an automobile to a headlamp provided with the above mentioned vent nozzle, the water can pass through the inlet opening, the passage and the outlet opening into the interior of the device. Such a development is highly undesirable.

SUMMARY OF THE INVENTION

Accordingly, it is an object of the present invention to provide a cap for a vent nozzle which avoids the disadvantages of the prior art.

More particularly, it is an object of the present invention to provide such a cap for a vent nozzle which substantially prevents penetration of water through the nozzle into the interior of the device, for example a headlamp of an automobile.

In keeping with these objects and with others which will become apparent hereinafter, one feature of the present invention resides, briefly stated, in a cap of a vent nozzle, which includes a main cap part provided with an inlet opening, and an auxiliary cap part which is connected with the main part and turnable relative to the main part so as to fit on the top of said main part, wherein the auxiliary part is provided with a passage having one end arranged to communicate with the inlet opening of the main cap part and another end which opens toward an interior of the vent nozzle.

When the cap is designed in accordance with the present invention, the interior of the device is sufficiently vented through the vent nozzle, and at the same time undesirable water penetration through the vent nozzle is avoided.

The cap has means for connecting the main cap part and the auxiliary part with one another and including a flexible element formed so that the auxiliary part can be turned around an axis extending transverse to the flexible element to be fitted on the main cap part.

The flexible connecting element can be formed as a film hinge, and the main cap part, the auxiliary cap part and the connecting means can be formed of one piece integral with one another so that the cap is an integral one-piece element.

The auxiliary cap part can have an engaging formation formed so that in the fitted position the engaging formation engages underneath the main cap part and firmly retains the auxiliary cap part on the main cap part.

The passage of the auxiliary cap part can have a main portion extending circularly around the axis and an end portion extending radially and provided with the outlet opening.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 6 and 7 are showing sections 6—6 and 7—7 taken in FIG. 1 through the auxiliary cap part;

FIG. 9 is a view showing the inventive cap for the vent nozzle in an assembled condition.

DESCRIPTION OF THE PREFERRED EMBODIMENTS

Figure 1:
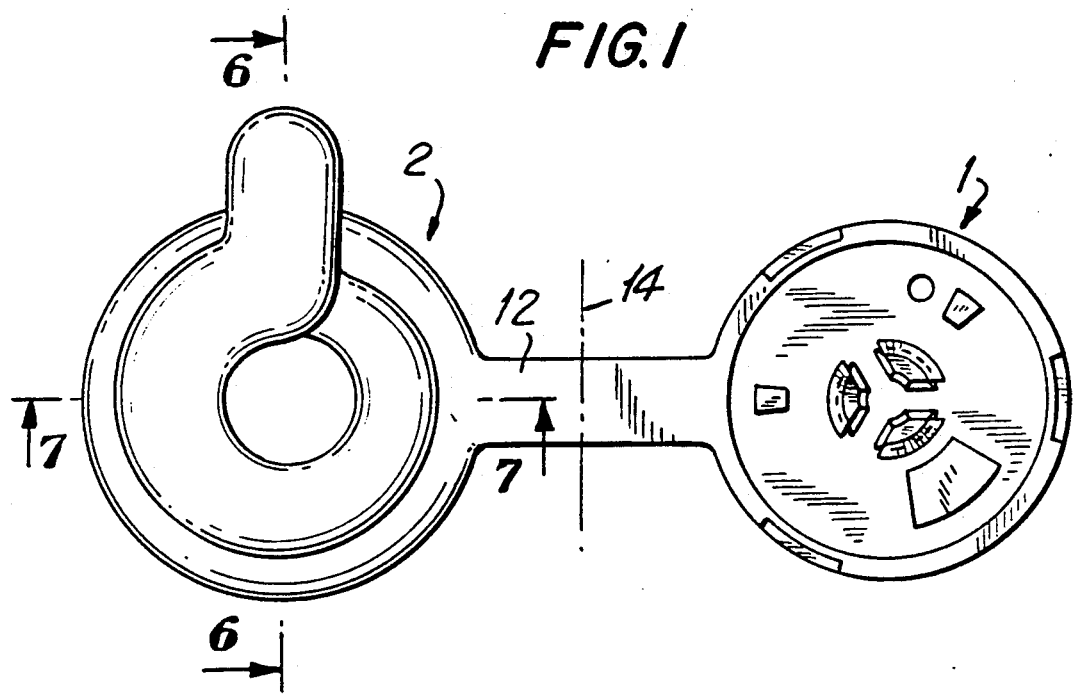
FIG. 1 is a plan view of a cap for a vent nozzle, in a position before use.
Figure 8:
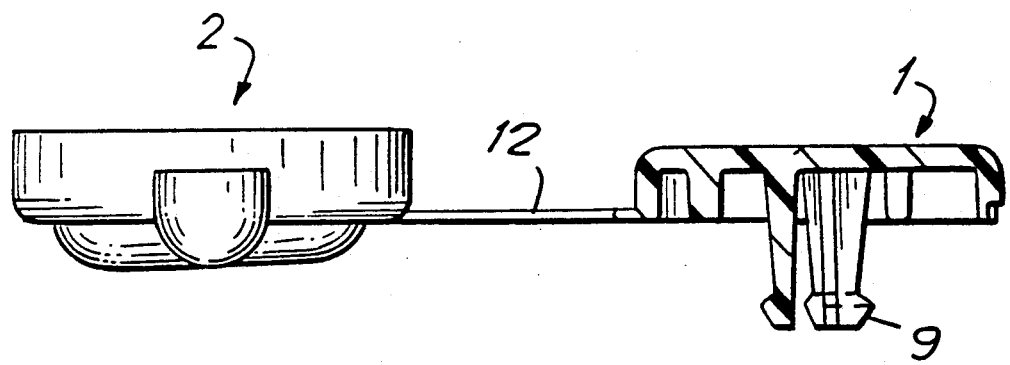
FIG. 8 is a view showing a side view of the inventive cap for the vent nozzle.
Figure 2:
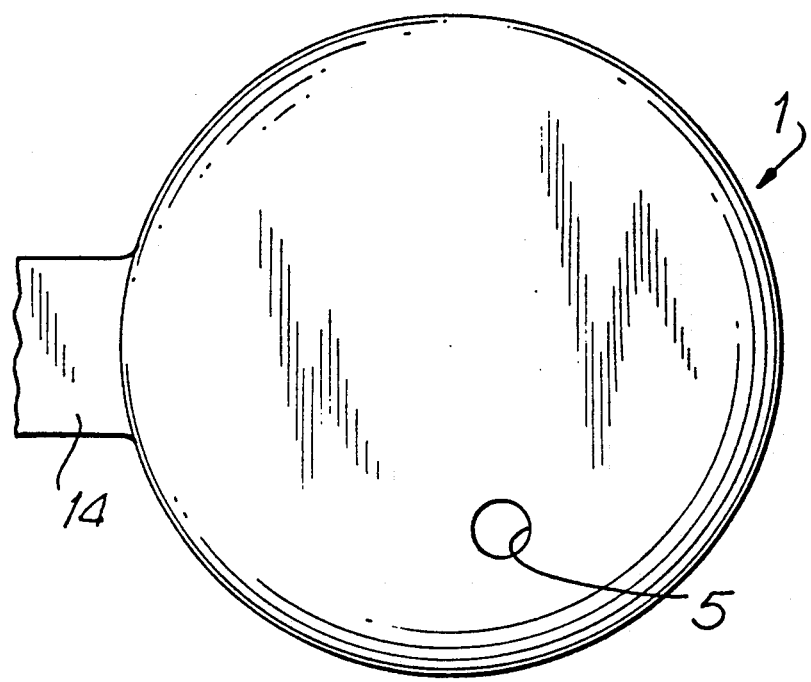
FIG. 2 is a plan view of a top surface of a main cap part of the vent nozzle in accordance with the present invention.
Figure 3:
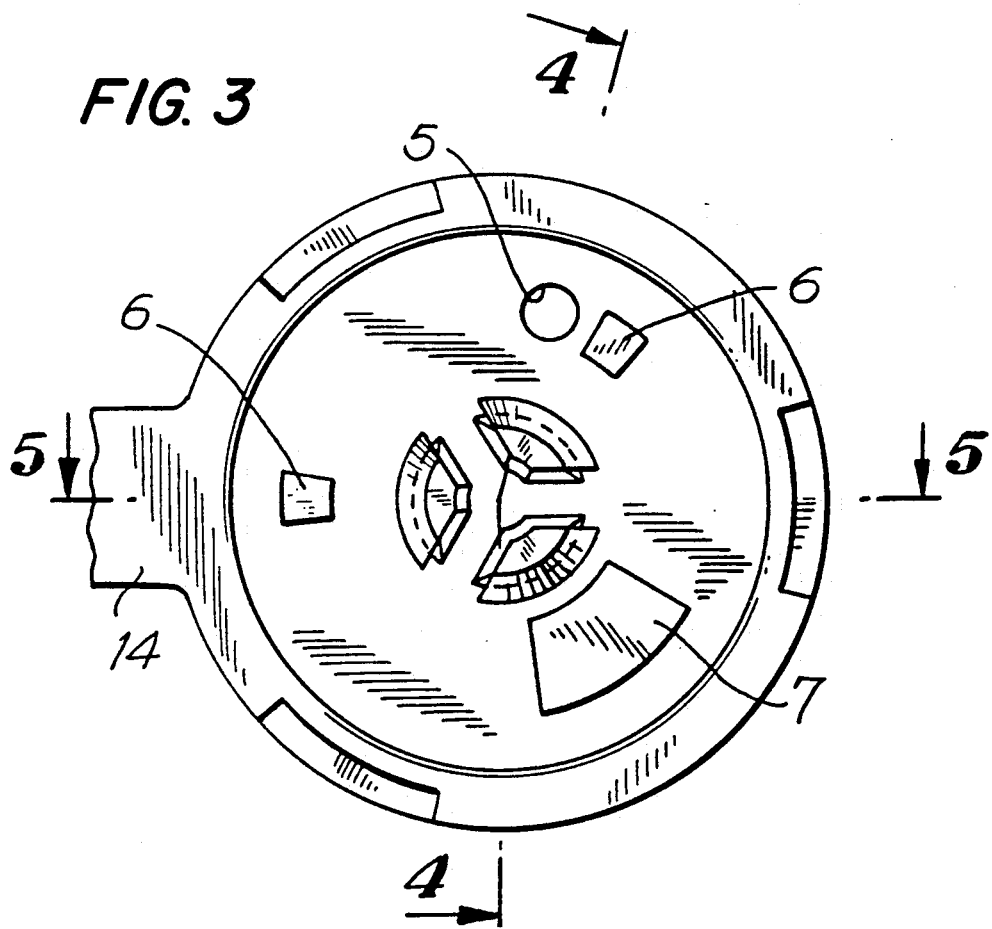
FIG. 3 is a plan view of the bottom surface of the main cap part of FIG. 2.
Figure 4:
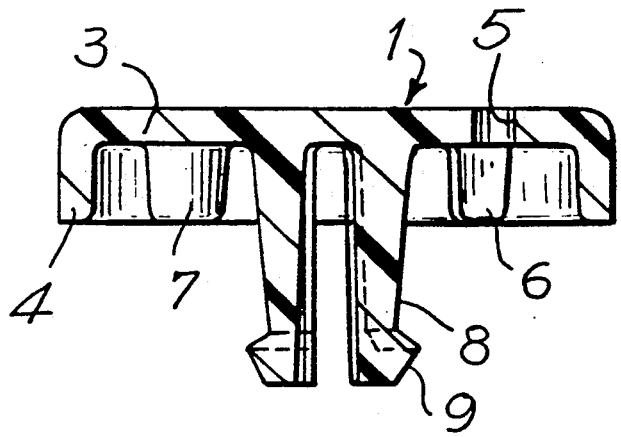
FIGS. 4 and 5 are views showing sections of the main cap part of FIGS. 2 and 3 taken along the lines 4—4 and 5—5 in FIG. 3.
Figure 5:
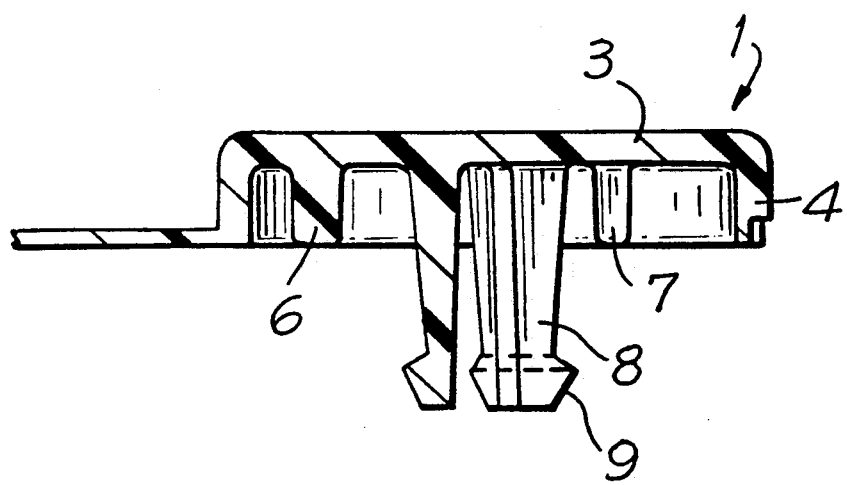

A cap for an adjustable vent nozzle for headlamps, other lamps and other devices has two cap parts identified as a whole with reference numerals 1 and 2. The main cap part 1 is substantially cup-shaped and has a top wall 3 and a peripheral wall 4. An inlet opening 5 extends through the top wall 3 and communicates the interior of the vent nozzle with the ambient atmosphere. The bottom surface of the main cap part 1 is provided with two guiding projections 6 which are angularly spaced from one another and also with an adjusting projection 7 angularly spaced from the guiding projections. The guiding projections 6 are located on the same radius. The main cap part 1 is also provided with engaging means which includes three plastic prongs 8 extending from the central area of the bottom surface of the main cap part 1 and angularly spaced from one another. The free end of each of the prongs 8 is provided with a double conical projection 9 having two oppositely inclined conical surfaces.

The main cap part 1 is adjustably connectable with a lower nozzle part, such as disclosed for example in the U.S. patent application Ser. No.: 403,147. The lower nozzle part is not disclosed here since it is not germaine to the present invention. However, its description is incorporated in this application by reference to the above mentioned U.S. patent application. The main cap part 1 is turnable relative to the lower nozzle part and can be pressed down at desired locations so that the pronges 8 are pressed radially inwardly and the double-conical ends extend downwardly beyond the lower surface of the lower nozzle member. Then they spread radially apart and engage from below the surface so that the main cap part can no longer be withdrawn upwardly. The desired location is selected in dependence upon the required ventilation of a respective device. Depending on the angular position of the inlet opening 5 relative to a passage and an outlet opening in the lower nozzle member, the length of the passage between the inlet opening and the outlet opening can be adjusted and therefore the air supply is also adjusted.

In accordance with the present invention, the cap is provided with an auxiliary cap part 2. The auxiliary cap part 2 is generally cup-shaped and is provided with a passage 10. The passage 10 opens in an outlet opening 11. The auxiliary cap part 2 is connected with the main cap part 1 by an elastic connecting part 12 formed preferably as a film hinge.

The auxiliary cap part 2 can be provided with an engaging formation 13.

In a working condition, when the main cap part 1 is placed on the above mentioned lower nozzle part and engaged with the latter, the inlet opening 5 of the main cap part opens upwardly. Then, the auxiliary cap part 2 is turned around an axis 14 and fitted over the main cap part 1 so that the engaging formation 13 engages underneath the main cap part 1. In this position the inlet opening 5 of the main cap part 1 communicates with the passage 10 which in turn communicates with the outlet opening 11 facing downwardly or toward the interior of the vent nozzle. During water application to the device to be vented with the vent nozzle, the water flow through the vent is significantly reduced or completely eliminated.

It will be understood that each of the elements described above, or two or more together, may also find a useful application in other types of constructions differing from the types described above.

While the invention has been illustrated and described as embodied in a cap for vent nozzles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A cap for vent nozzles, comprising a main cap part turnably mountable on a lower nozzle member to adjust a passage through the vent nozzle, said main cap part having an inlet opening formed to communicate with an ambient atmosphere and allow air to come into the lower nozzle member and then into an interior of a device to be vented; an auxiliary cap part connected with said main cap part and provided with a passage and an outlet opening communicating with said passage, said auxiliary part being formed so that it is fittable on said main cap part so that in a fitted condition said passage communicates with said inlet opening of said main cap part and said outlet opening of said auxiliary cap apart faces toward an interior of the vent nozzle in a direction opposite to said inlet opening of said main cap part; a flexible element connecting said main cap part and said auxiliary part with one another permitting said auxiliary part to be turned and fitted on said main cap part.

2. A cap as aefined in claim 1, wherein said flexible element is formed as a film hinge.

3. A cap as defined in claim 1, wherein said auxiliary cap part has an engaging formation formed so that in the fitted position said engaging formation engages said main cap part from below and firmly retains said auxiliary cap part on said main cap part.

4. A cap for vent nozzles, comprising a main cap part turnably mountable on a lower nozzle member to adjust a passage through the vent nozzle, said main cap part having an inlet opening formed to communicate with an ambient atmosphere and allow air to come into the lower nozzle member and then into an interior of a device to be vented; an auxiliary cap part connected with said main cap part and provided with a passage and an outlet opening communicating with said passage, said auxiliary part being formed so that it is fittable on said main cap part so that in a fitted condition said passage communicates with said inlet opening of said main cap part and said outlet opening of said auxiliary cap part faces toward an interior of the vent nozzle in a direction opposite to said inlet opening of said main cap pat, said main cap part, said auxiliary cap part and said connecting means are formed of one piece so that the cap is a one-piece element.

5. A cap as defined in claim 4, wherein said auxiliary part has an axis, said passage having a main portion extending circularly around said axis and an end portion extending radially to said axes and provided with said outlet opening.

* * * * *